US012441011B2

(12) United States Patent
Cauley, Jr. et al.

(10) Patent No.: US 12,441,011 B2
(45) **Date of Patent: *Oct. 14, 2025**

(54) KNIFE HAVING REMOVABLE BLADE

(71) Applicant: AOB Products Company, Columbia, MO (US)

(72) Inventors: Dennis W. Cauley, Jr., Fayette, MO (US); James Tayon, Moberly, MO (US); Michael Cottrell, Ashland, MO (US); Justin Burke, Columbia, MO (US); Brian Steere, Columbia, MO (US); Kyle Martin, Columbia, MO (US); Anthony Vesich, Columbia, MO (US); Matthew Kinamore, Columbia, MO (US); Seth Wheeler, Columbia, MO (US); Michael Lindsay, Columbia, MO (US); Ryan Varnum, Columbia, MO (US); Curtis Smith, Columbia, MO (US); Josh Neville, Columbia, MO (US); Mark Dalton, Columbia, MO (US); Timothy S. Kinney, Warrenton, MO (US)

(73) Assignee: AOB Products Company, Columbia, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/092,504

(22) Filed: Mar. 27, 2025

(65) Prior Publication Data

US 2025/0222602 A1 Jul. 10, 2025

Related U.S. Application Data

(63) Continuation of application No. 18/931,237, filed on Oct. 30, 2024, now Pat. No. 12,285,879, which is a continuation of application No. 18/735,327, filed on Jun. 6, 2024, which is a continuation of application No. 16/903,866, filed on Jun. 17, 2020, now Pat. No. 12,030,203.

(60) Provisional application No. 62/862,317, filed on Jun. 17, 2019.

(51) Int. Cl.
*B26B 5/00* (2006.01)
*B25G 3/18* (2006.01)
*B26B 9/00* (2006.01)

(52) U.S. Cl.
CPC .................. *B26B 5/00* (2013.01); *B25G 3/18* (2013.01); *B26B 9/00* (2013.01)

(58) Field of Classification Search
CPC ........... B26B 5/00; B26B 5/001; B26B 5/005; B26B 9/00; B26B 7/00; B25G 3/18; B25G 3/12
USPC ........................................... 30/337, 329, 338
See application file for complete search history.

(56) References Cited

U.S. PATENT DOCUMENTS 3,241,236 A 3/1966 Capps
3,900,950 A 8/1975 Collins
3,930,309 A 1/1976 Collins
4,841,638 A 6/1989 Bardeen et al.
(Continued)

*Primary Examiner* — Phong H Nguyen
(74) *Attorney, Agent, or Firm* — Stinson LLP

(57) ABSTRACT

A knife comprising a handle and a blade assembly. The blade assembly includes a blade, a tang, and blade assembly connection structure. The handle includes a receiver configured to receive the tang, and includes handle connection structure. The blade assembly connection structure and handle connection structure are arranged to releasably lock the blade assembly in an installed position on the handle with the tang in the tang receiver.

30 Claims, 12 Drawing Sheets

(56) References Cited

U.S. PATENT DOCUMENTS

| | | | |
|---|---|---|---|
| D320,544 | S | 10/1991 | Thompson |
| 5,123,167 | A | 6/1992 | Kelley |
| D346,422 | S | 4/1994 | Seber et al. |
| 5,342,379 | A | 8/1994 | Volinsky |
| 5,448,833 | A | 9/1995 | Coon |
| D397,190 | S | 8/1998 | Balolia |
| D402,856 | S | 12/1998 | Cohen et al. |
| 5,933,918 | A | 8/1999 | Wallays |
| 6,085,424 | A | 7/2000 | Mai |
| 8,099,868 | B1 | 1/2012 | Votolato |
| D709,983 | S | 7/2014 | Cagampang |
| 9,586,329 | B2 | 3/2017 | Schuft |
| D791,267 | S | 7/2017 | Bloch |
| D798,988 | S | 10/2017 | Wolf et al. |
| D801,469 | S | 10/2017 | Mandeville et al. |
| D844,737 | S | 4/2019 | Jaramus et al. |
| 10,349,664 | B2 | 7/2019 | Schuft |
| 10,518,425 | B2 | 12/2019 | Bloch et al. |
| D876,579 | S | 2/2020 | Pohl |
| D876,580 | S | 2/2020 | Pohl |
| D904,833 | S | 12/2020 | Singer |
| D915,542 | S | 4/2021 | Cavanaugh, Jr. |
| 11,370,132 | B2 | 6/2022 | Tsai |
| D966,801 | S | 10/2022 | Liu |
| D974,142 | S | 1/2023 | Gendron, Jr. |
| D982,412 | S | 4/2023 | Chen |
| 2005/0252010 | A1 | 11/2005 | Freeman |
| 2009/0038164 | A1 | 2/2009 | Vitantonio et al. |
| 2010/0170095 | A1 | 7/2010 | Russell |
| 2010/0263219 | A1 | 10/2010 | Kempker et al. |
| 2011/0030224 | A1 | 2/2011 | Wang |
| 2011/0030225 | A1 | 2/2011 | Wang |
| 2012/0036668 | A1 | 2/2012 | Farland et al. |
| 2012/0079723 | A1 | 4/2012 | Owens |
| 2014/0345147 | A1 | 11/2014 | Frazer et al. |
| 2017/0151682 | A1 | 6/2017 | Cheng |
| 2017/0172162 | A1 | 6/2017 | Schuft |
| 2017/0190042 | A1 | 7/2017 | Yu |
| 2018/0036894 | A1 | 2/2018 | Bloch et al. |
| 2018/0099424 | A1 | 4/2018 | Huang |

KNIFE HAVING REMOVABLE BLADE

CROSS-REFERENCE TO RELATED APPLICATIONS

This application claims priority to and is a continuation of U.S. patent application Ser. No. 18/931,237, filed Oct. 30, 2024, which claims priority to and is a continuation of U.S. patent application Ser. No. 18/735,327, filed Jun. 6, 2024, which claims priority to and is a continuation of U.S. patent application Ser. No. 16/903,866, filed Jun. 17, 2020, now issued U.S. Pat. No. 12,030,203, which claims priority to and the benefit of U.S. Provisional Application No. 62/862,317, filed Jun. 17, 2019, the entireties of which are hereby incorporated by reference.

FIELD

The present disclosure generally relates to knives, and more particularly to a knife having a handle and a blade selectively removable from the handle.

BACKGROUND

Many types of knives are used for various tasks. Knives having different types of blades are used in different circumstances. A user may own a variety of knives having blades ranging from small to large in size, and having different blade features, such serration, flexibility, etc.

SUMMARY

In one aspect, a knife blade assembly is selectively connectable to a knife handle. The knife blade assembly comprises a tang having a forward end and a rear end, and a blade including a front tip and a rear portion opposite the front tip. The rear portion is connected to the forward end of the tang. The knife blade assembly includes a first retainer connected to the tang. The first retainer includes a first catch. The first catch is resiliently movable with respect to the tang to move into locking engagement with the knife handle to lock the blade in an installed position on the knife handle.

In another aspect, a knife blade assembly is selectively connectable to a knife handle. The knife blade assembly comprises a blade having a front tip and a rear portion opposite the tip. The knife blade assembly includes a tang having a forward end and a rear end opposite the forward end. The forward end is connected to the rear portion of the blade. A first lock surface is engageable with the knife handle to releasably lock the blade assembly in an installed position on the knife handle. A first press surface is carried by and movable with respect to the tang. The first press surface is arranged to unlock the blade assembly from the knife handle responsive to manual pressing on the first press surface.

In another aspect, a knife comprises a handle and a blade assembly. The handle comprises a front end, a rear end, and a tang receiver. The blade assembly includes a tang and a blade. The tang is slidable into the tang receiver from the front end of the handle for mounting the blade assembly on the handle. When the blade assembly is mounted on the handle, at least one of the blade receiver or the tang is visible at the rear end of the handle.

In another aspect, a knife comprises a handle and a blade assembly. The handle includes a tang receiver. The blade assembly includes a blade and a tang. The tang is slidable into the tang receiver to move the blade assembly to an installed position on the handle. At least one of the handle or the blade assembly comprises a first lock surface and a second lock surface. When the blade assembly is in the installed position on the handle, the first and second lock surfaces are engaged with the other of the at least one of the handle or the blade assembly from opposite sides of the tang for releasably locking the blade assembly in the installed position.

In another aspect, a knife comprises a handle and a blade assembly. The handle includes a tang receiver. The blade assembly includes a blade and a tang. The tang is slidable into the tang receiver to move the blade assembly to an installed position on the handle. At least one of the handle or the blade assembly include a first catch. The first catch is resiliently movable away from the tang from a deflected position to a locking position in which the catch is in locking engagement with the other of said at least one of the handle or the blade assembly to releasably lock the blade assembly in the installed position.

In yet another aspect, a knife comprises a handle and a blade assembly. The handle includes a tang receiver. The blade assembly includes a blade and a tang. The tang is slidable into the tang receiver to move the blade assembly into an installed position on the handle. The blade assembly includes a collar extending laterally outboard of the blade and configured to cover a portion of the handle when the blade assembly is in the installed position on the handle.

Other objects and features of the present disclosure will be in part apparent and in part pointed out herein.

BRIEF DESCRIPTION OF THE DRAWINGS

Corresponding reference characters indicate corresponding parts throughout the drawings.

DETAILED DESCRIPTION

Figure 1:
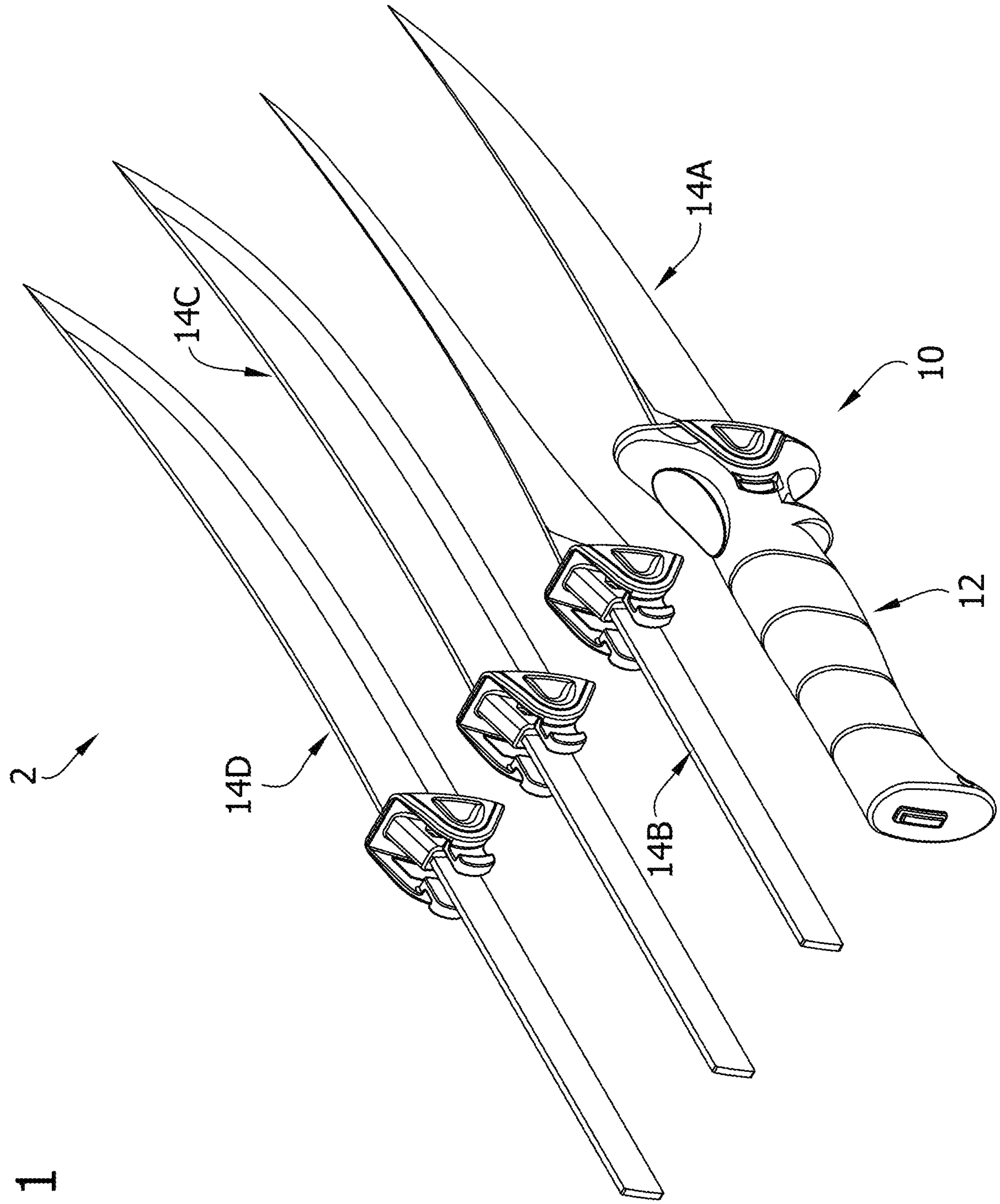
FIG. 1 is a front perspective of an interchangeable blade knife kit.
Figure 2:
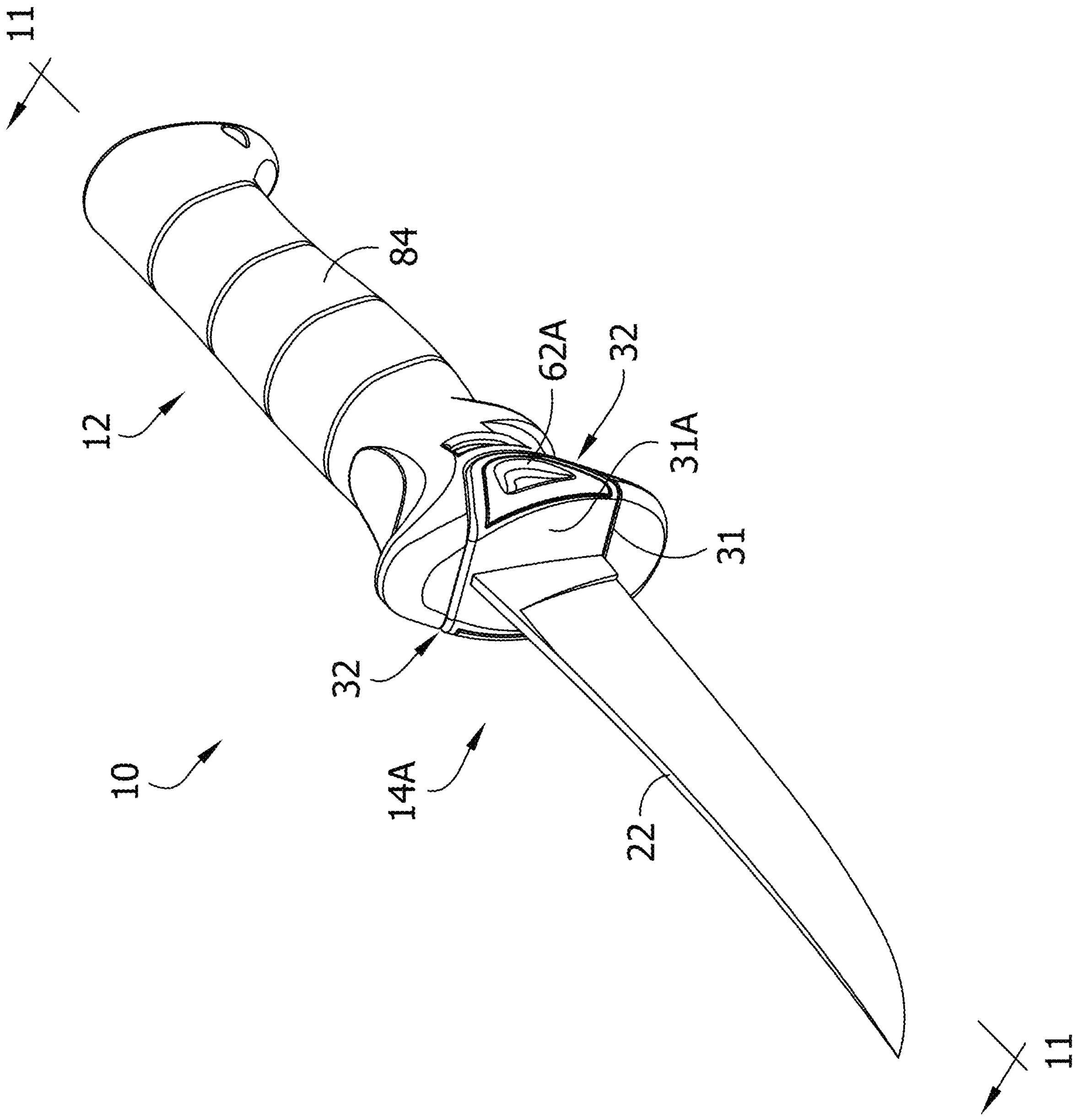
FIG. 2 is a rear perspective of a knife of the interchangeable blade knife kit.

Referring to FIG. 1, a kit of the present disclosure is generally indicated by the reference number 2. The kit includes a knife 10 including a handle 12 and a blade assembly 14A. The kit includes additional blade assemblies 14B-14D. As explained in further detail below, the blade assembly 14A is removable from the handle 12, and other blade assemblies 14B-14D can be installed in the handle for use with the handle as a knife.

The handle 12 includes an elongate body having a forward end and an opposite rear end. The forward end includes a mouth for receiving and interfacing with the blade assembly 14A. The handle 12 includes a receiver 20 (FIG. 6) in which the blade assembly is receivable from the mouth end. The receiver 20 defines an elongate opening 20A having a generally rectangular cross-sectional shape for receiving the blade assembly. The handle 12 will be described in further detail below.

Figure 9:
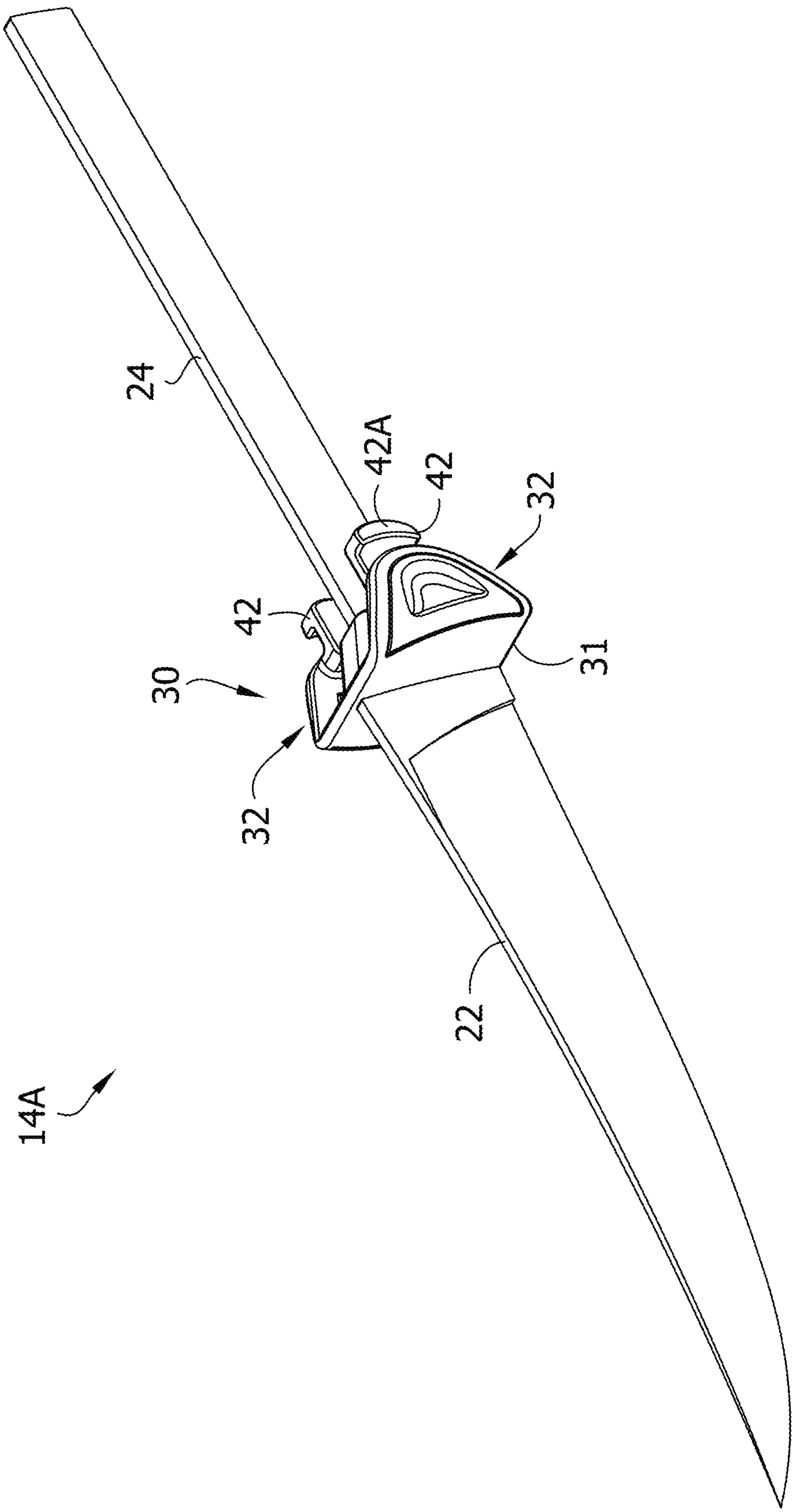
FIG. 9 is a rear perspective of a blade assembly of the interchangeable blade knife kit.

As shown in FIG. 9, the blade assembly 14A includes a blade 22 and a tang 24. The blade 22 has a rear portion, and a tip opposite the rear portion. The blade has a cutting edge extending from the rear portion to the tip, and a ricasso (unsharpened portion) rearward from the cutting edge. The tang 24 has a rear end and an opposite forward end connected to the rear portion of the blade (e.g., formed integrally with the blade). The tang 24 has a generally rectangular cross-sectional shape corresponding to the cross-sectional shape of the elongate opening 20A in the receiver 20. The tang 24 is sized and shaped to slide into the receiver 20. The receiver 20 is configured to provide a tight fit of the tang 24 in the receiver but permit sliding of the tang into and out of the receiver. It will be appreciated that other configurations and types of blades and tangs can be used without departing from the scope of the present disclosure.

Figure 10:
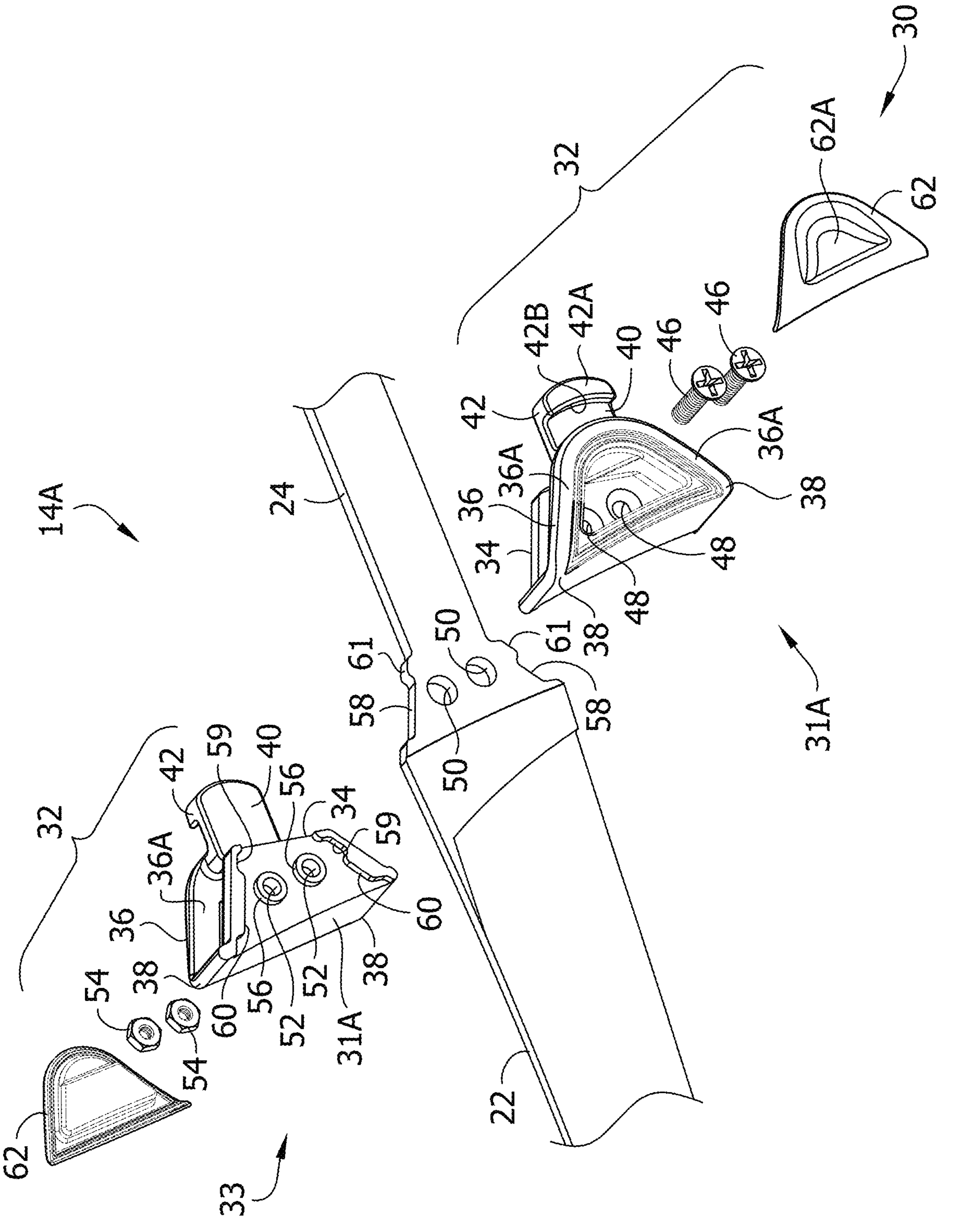
FIG. 10 is an enlarged, fragmentary perspective of the blade assembly having a connection structure exploded from a blade and tang thereof.

Referring to FIGS. 9 and 10, the blade assembly 14A includes blade assembly connection structure 30 for connecting the blade assembly to the handle 12. In the illustrated embodiment, the blade assembly connection structure 30 includes a collar 31 (FIG. 9) on the tang 24 adjacent the rear portion of the blade 22, and first and second retainers 32, which are provided in the form of a latches extending rearward from the collar 31 on opposite sides of the forward end of the tang 24. The collar 31 and latches 32 are defined by two connection members 33 (FIG. 10) that sandwich the forward end of the tang 24. Each connection member 33 includes a bracket 34 configured to be secured to the forward end of the tang 24, a collar portion 31A, and a latch 32. The collar 31 extends laterally from the tang 26 on opposite sides of the tang. As will become apparent, the collar 31 covers a portion of the handle (e.g., at least partially defines a guard or bolster and/or front bolster or guide surface facing the tip of the blade) when the blade assembly 14A is in the installed position on the handle 12.

Each latch 32 comprises a lever 36 connected to the collar 31 by a fulcrum 38. In the illustrated embodiment, the fulcrum 38 comprises a living hinge. The lever 36 includes first and second arms 36A having upper ends connected to the collar 31 at the fulcrum 38. The lower ends of the arms 36A are joined to each other, and a tab 40 extends from the lower ends of the arms. A lug 42 or protrusion, which acts as a catch, protrudes from the tab 40 away from the tang 24. Each lug 42 extends laterally away from the tang 26, has a cam surface 42A (e.g., tapered or ramped) facing laterally or away from the tang 24, and has a lock surface 42B facing forward generally toward the tip of the blade 26 for locking engagement with the handle 12 to releasably secure the blade assembly 14A in an installed position on the handle. As will become apparent, the arms 36A, tabs 40, and catches 42 are pivotable about the fulcrums 38 to move the catches between deflected positions (closer to the tang 26) and locking positions (farther from the tang) to lockingly engage the handle 12. The catches 42 may be pivotable with respect to the fulcrums 38 by pivoting at the fulcrums and/or by flexing of the arms 36A. The fulcrums 38 and arms 36A are resiliently deformable such that when the catches 38 are deflected inward toward the tang, the fulcrums and/or arms resiliently bias the catches outward, away from each other and away from the tang.

The connection members 33, and more specifically the brackets 34, are secured to the forward end of the tang 16 by fasteners 46 (e.g., screws). In the illustrated embodiment, the first bracket 34 includes openings 48 configured to receive screws, which pass through openings 50 in the forward end of the tang 26, and the second bracket 34 includes openings 52 configured to capture nuts 54 (to prevent the nuts from turning) into which the screws are threaded. The first and second brackets 34 define bushings 56 that extend into the openings 50 in the forward end of the tang 26 to stabilize the latches 32 with respect to the blade and tang. The forward end of the tang 26 defines notches 58 into which ribs 60 of the brackets 34 are receivable to further stabilize the latches 32 with respect to the blade and tang. The brackets 34 define recesses 59 sized to closely conform to and receive shoulders 61 on the forward end of the tang 26 to even further stabilize the latches 32 with respect to the blade and tang. The screws 46 and nuts 54 can be installed through openings in the latches between the arms 36A, and the openings can then be covered with panels 62 defining release buttons having press surfaces 62A. The panels 62 can be secured in position on the lever 36 using adhesive or other means. The lever 36, panel 62, tab 40, and lug 42 of a latch 32 can be broadly referred to as a wing connected to the collar 31 by the living hinge 38.

It will be appreciated that the other blade assemblies 14B-14D have constructions essentially the same as that of the blade assembly 14A, except the blade assemblies 14B-14D have a blades of different shapes, different sizes, and/or different types of cutting edge, etc.

Figure 6:
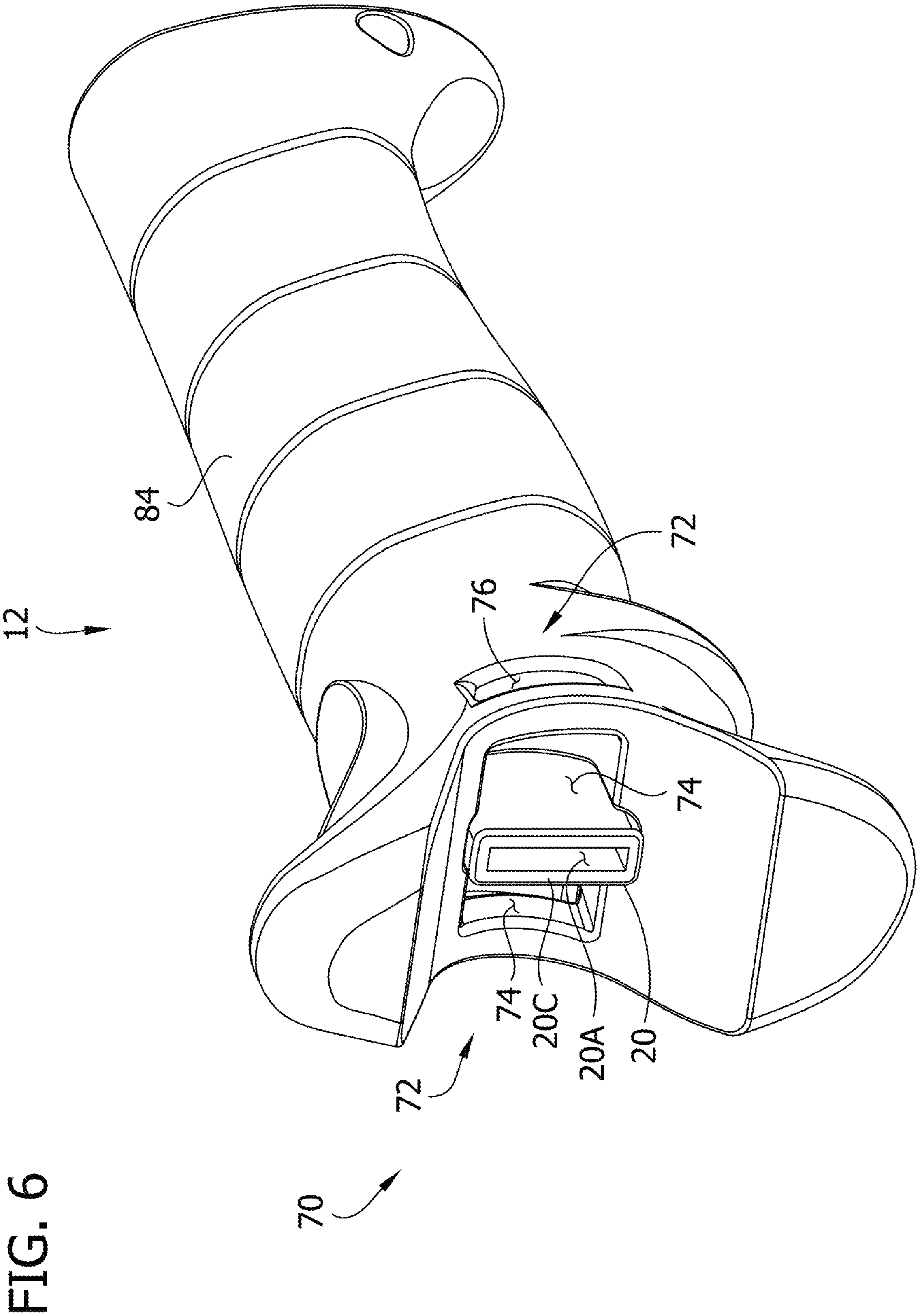
FIG. 6 is an enlarged rear perspective of a handle of the interchangeable knife kit.
Figure 7:
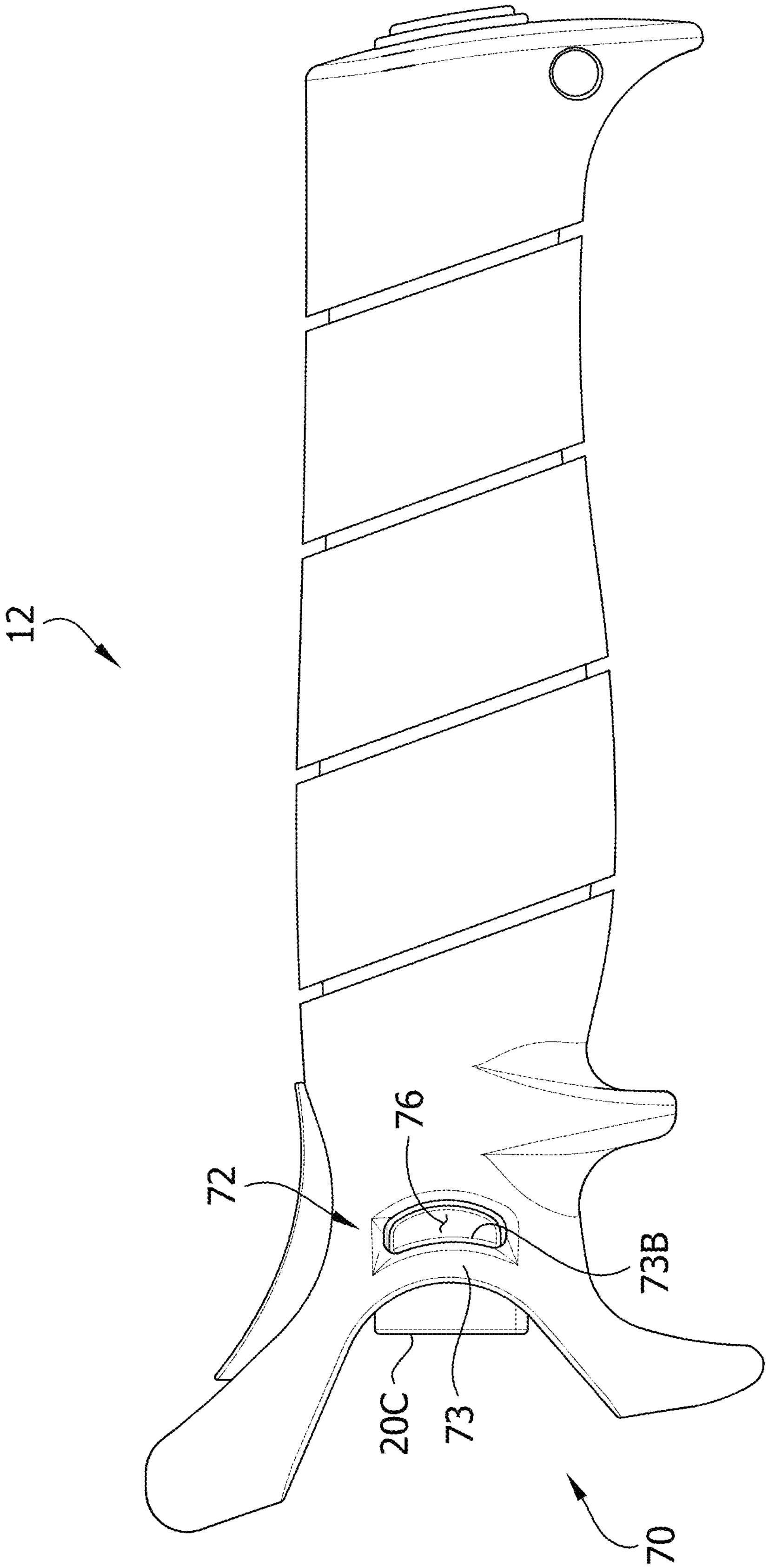
FIG. 7 is a rear elevation of the handle.
Figure 8:
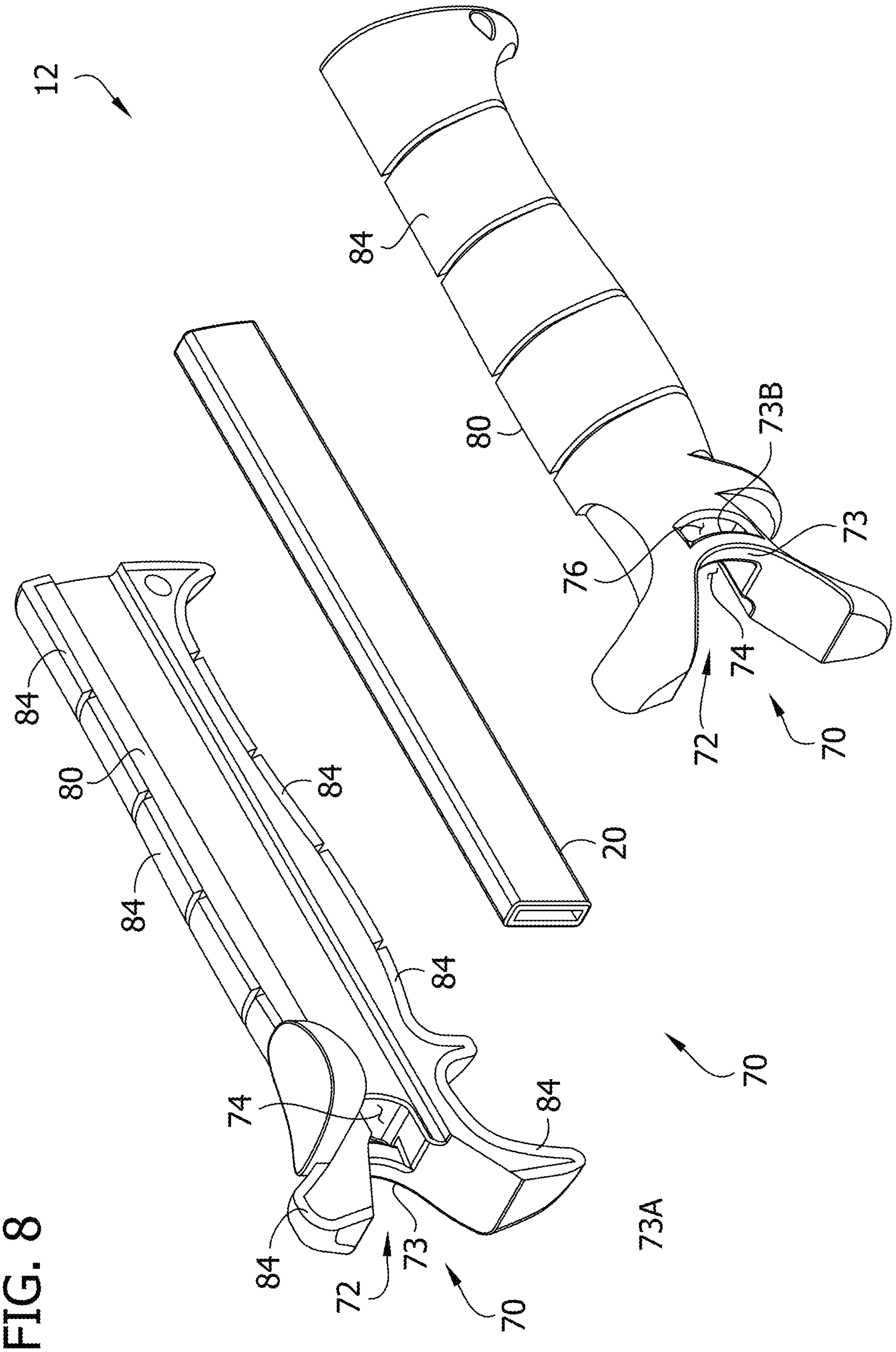
FIG. 8 is an exploded rear perspective of the handle.

Referring to FIGS. 6-8, the forward end of the handle 12 includes handle connection structure 70 configured to form a releasable connection with the blade assembly connection structure 30. In the illustrated embodiment, the handle connection structure 70 comprises keepers 72 on opposite sides of the forward end of the handle 12. The keepers 72 include ribs 73 each having a cam surface 73A (e.g., tapered or ramped) and a lock surface 73B for engaging the lugs 42 of the latches 32. The keepers 72 also include channels 74 extending from the mouth of the handle 12 on opposite sides of the receiver 20. The channels 74 extend toward the rear end of the handle 12 and are sized to permit passage of the lugs 42. Recesses 76 sized to receive the lugs 42 extend outward from the channels 74. In the illustrated embodiment, the recesses 76 open out of the opposite sides of the handle 12. The lugs 42 are exposed at the recesses 76 when the blade assembly 14A is connected to the handle 12.

The arrangement is such that as the tang 24 of the blade assembly 14A is moved into the receiver 20 of the handle 12, the blade assembly connection structure 30 eventually automatically engages and forms a releasable locked connection with the handle connection structure 70. In particular, the latches 32 of the blade assembly 14A engage and form releasable lock connections with the keepers 72 of the handle 12. As the tang 24 is moved into the receiver 20, the cam surfaces 42A of the lugs 42 engage and cam on the cam surfaces 73A of the ribs 73 to cause the lugs 42 to temporarily deflect inwardly by pivoting about the fulcrums 38 such as by flexing at the fulcrums or flexing at the arms (temporary resilient deformation). The lugs 42 ride in the channels 74 of the keepers 72 until the lugs reach the outwardly extending recesses 76. When the lugs 42 reach the recesses 76, the resilient deformation of the levers 36 causes the lugs to “snap” outward away from the tang 26 from deflected positions to locking positions in the recesses (e.g., making an audible “click” sound), thus forming the releasable lock connection of the handle and blade assembly connection structures, holding the blade assembly 14A in the installed position on the handle 12. In the installed position, the cam surfaces 73A of the ribs 73 engage the tabs 40, and the lock surfaces 42B of the lugs 42 engage the lock surfaces 73B of the keepers 72 to prevent the blade assembly 14A from being withdrawn from the handle 12.

Figure 11:
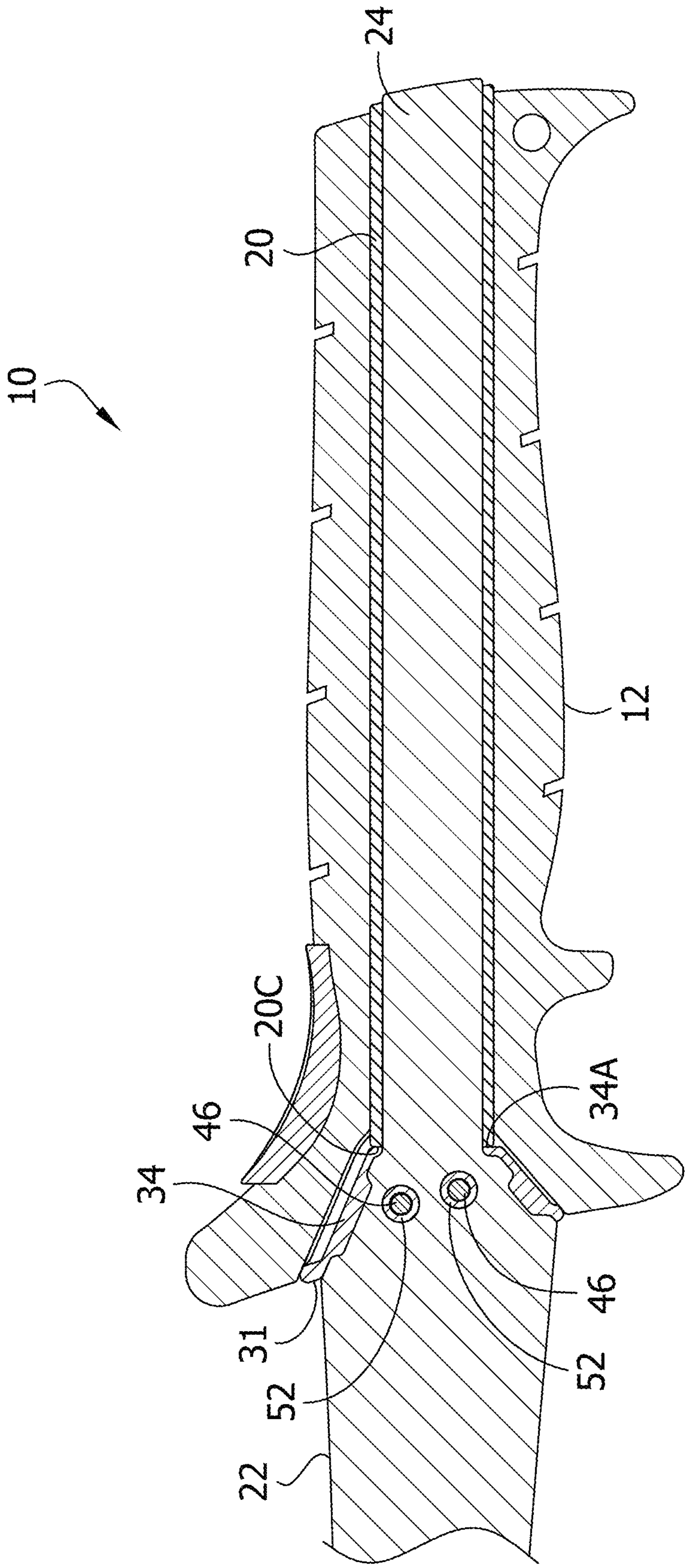
FIG. 11 is a section of the knife taken in a plane including line 11-11 of FIG. 2.
Figure 12:
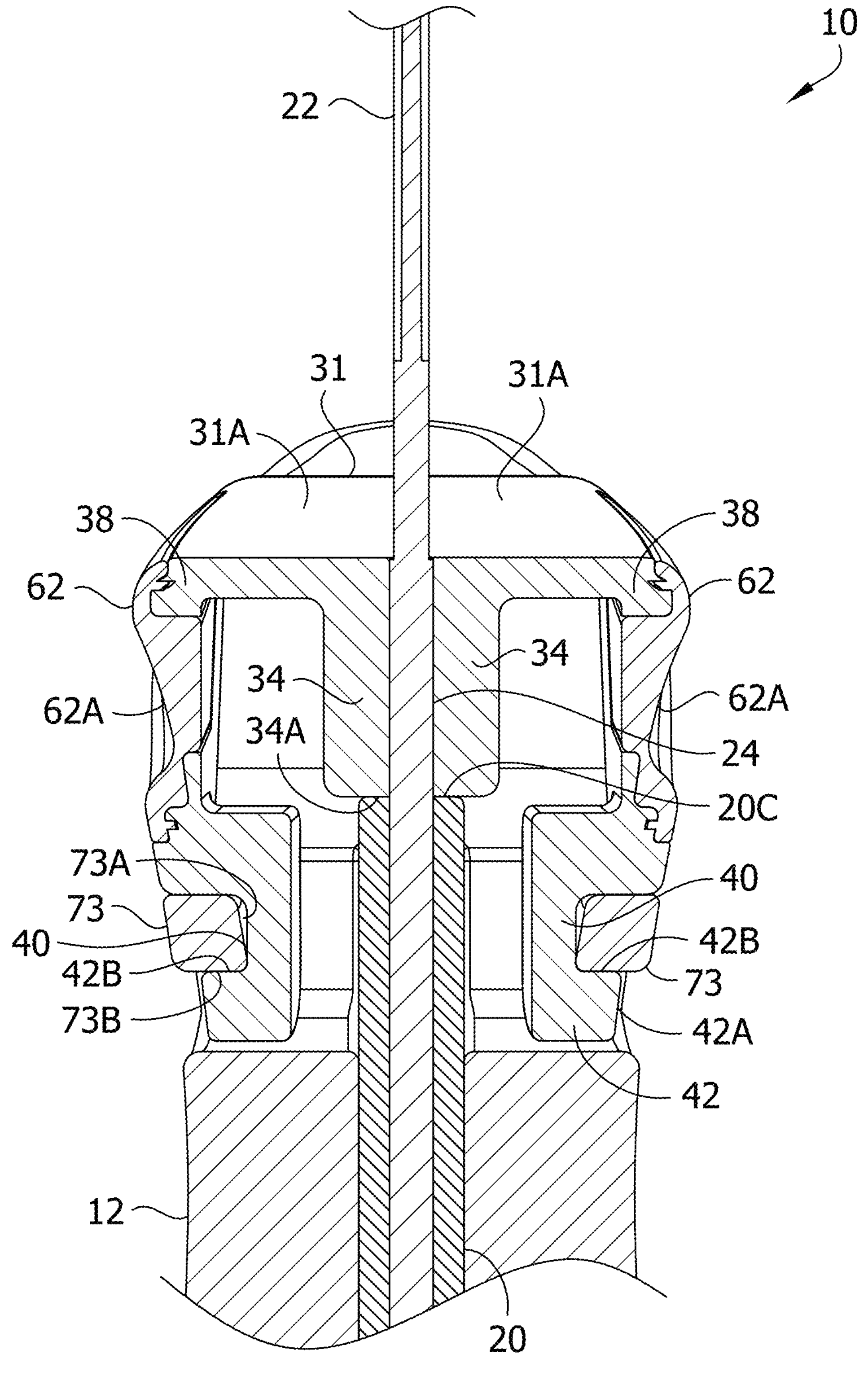
FIG. 12 is a section of the knife taken in a plane including line 12-12 of FIG. 4.

Desirably, at generally the same time the latches 32 form the releasable connections with the keepers 72, the blade assembly 14A covers the mouth of the handle 12. The collar 31, and the levers 36 of the latches 32, have shapes that closely conform to, fit into, and cover forward and side openings in the forward end of the handle. Moreover, as shown in FIGS. 11 and 12, the brackets 34 (defining rearward facing abutment surfaces 34A) abut the forward end of the receiver 20 (defining forward facing abutment surfaces 20C) when the releasable connection is made. Accordingly, the releasable connection of the blade assembly 14A to the handle 12 is particularly stable to prevent movement of the blade assembly with respect to the handle when the two are connected.

Figure 3:
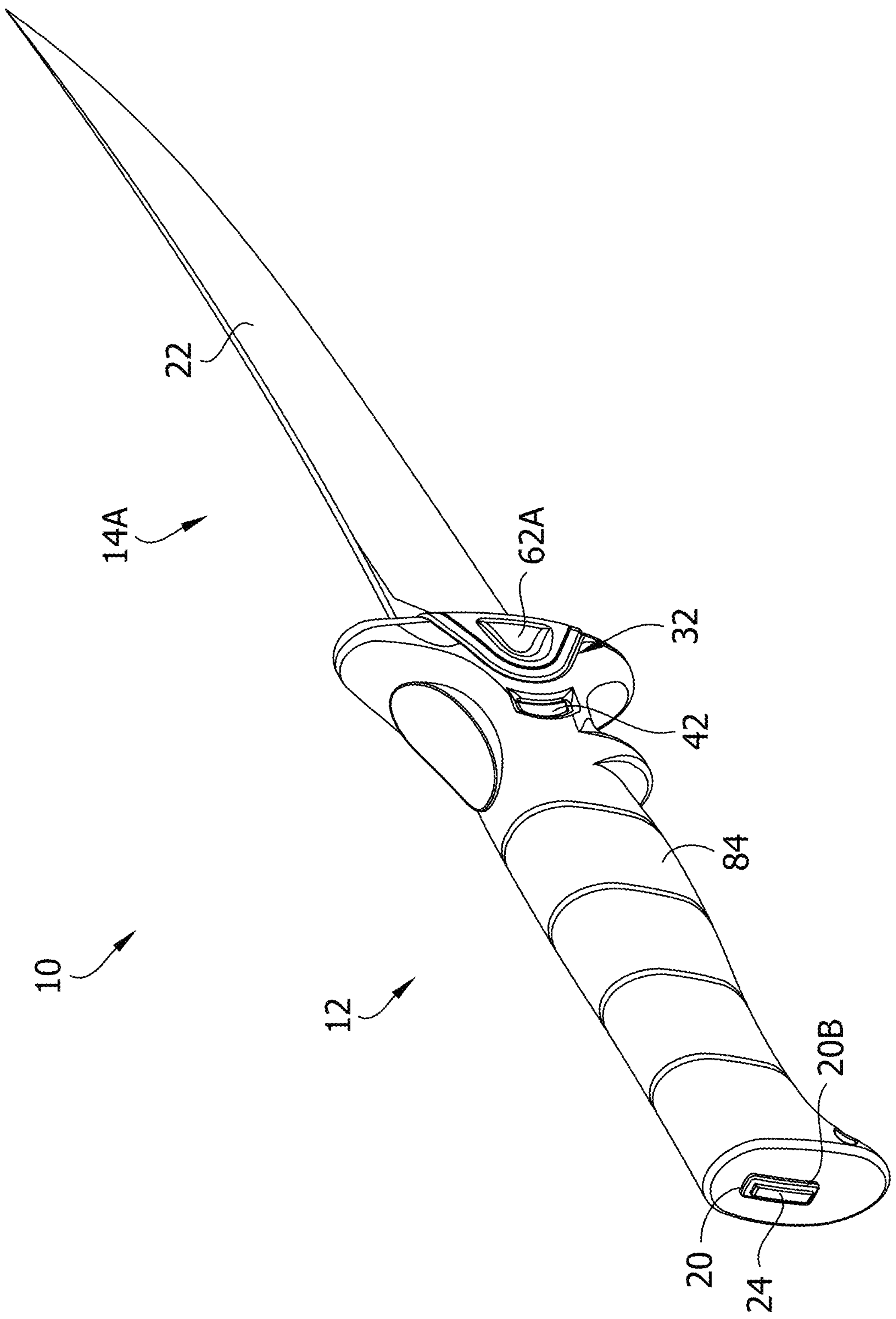
FIG. 3 is a front prospective of the knife of FIG. 2.
Figure 4:
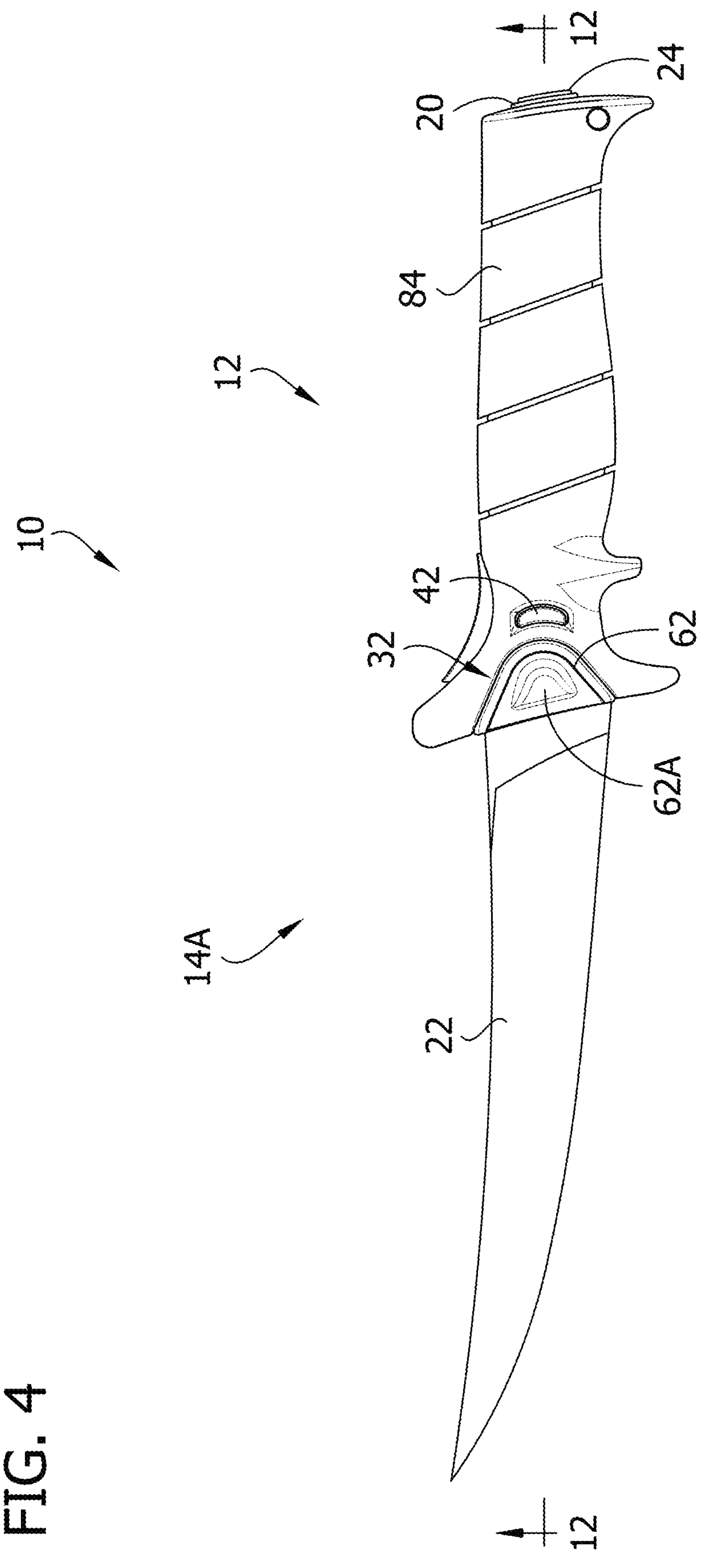
FIG. 4 is a rear elevation of the knife.
Figure 5:
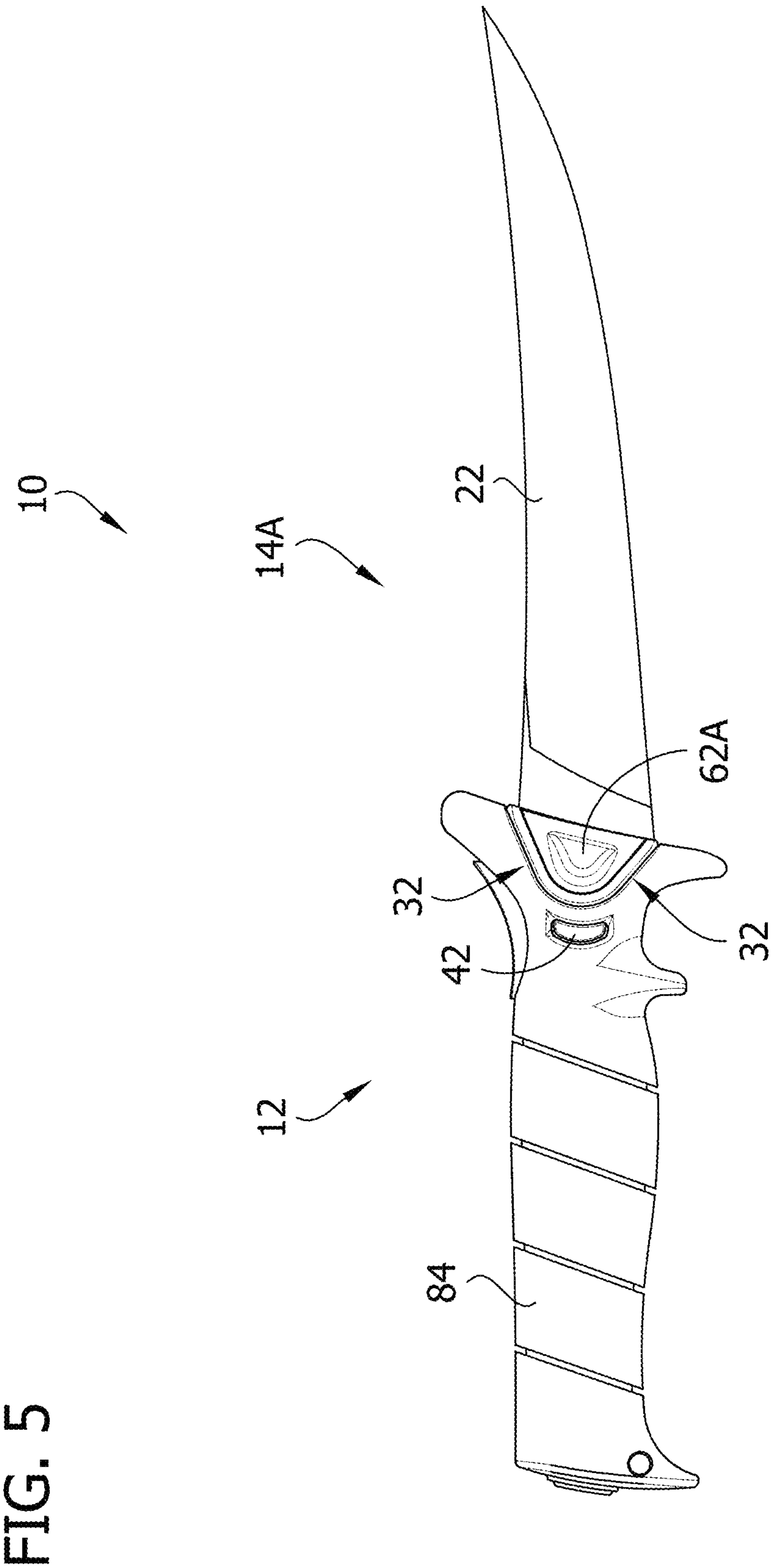
FIG. 5 is a front elevation of the knife.

As shown in FIG. 3, the receiver 20 is exposed at the rear end of the handle 12, and the receiver has an opening 20B through which the rear end of the tang 24 is visible from outside the handle. This shows the user that the tang 24 extends fully through the handle 12 and provides a strong assembly.

To release the connection of the blade assembly 14A and handle 12, a user can press the press surfaces 62A of the panels 62 toward each other (e.g., squeeze the blade assembly connection structure 30). This causes the lugs 42 to pivot about the fulcrums 38 (e.g., by flexing at the fulcrums 38 and/or arms 36A) and moves the lugs 42 inward toward the tang 26 from the locking positions to the deflected positions to withdraw them from the recesses 76. The channels 74 provide clearance for the tabs 40 and lugs 42 to move inward. The blade assembly 14A can then be moved to withdraw the tang 24 from the receiver 20. The user can do this by continuing to hold the blade assembly 14A by the press surfaces 62A, and moving the blade assembly and handle apart from each other. If desired, another blade assembly (e.g., blade assembly 14B-14D) having a similar tang and blade assembly connection structure, with a similar blade, or with a different type of blade and/or cutting edge, can be installed in the handle 12. Accordingly, a user can have the kit 14A-14D of blade assemblies usable with the handle 12 to form several different types of knives.

It will be appreciated that other types, numbers, arrangements, and configurations of connection structure can be used without departing from the scope of the present disclosure. For example, one or both of the retainers could be located on the handle 12, and likewise one or both of the keepers could be located on the blade assembly 14A, without departing from the scope of the present disclosure. Moreover, the knife can include other numbers (e.g., one, three, four, etc.) of retainers and keepers, and other types of retainers and keepers can be used. In one example, at least one of the handle and the blade assembly includes a retainer, and the other of the handle and the blade assembly includes a keeper configured to form a releasable connection with the retainer.

Referring to FIG. 8, an example method for making the handle 12 will now be discussed. The receiver 20 can be formed of metal or another suitable rigid material. For example, the receiver 20 can be extruded aluminum. The handle 12 includes two body members 80 (collectively, "handle body") that sandwich the receiver 20 to form a handle subassembly. The body members 80 can be formed of nylon or another suitable material. The body members 80 have inner recesses configured to receive opposite sides of the receiver 20 to substantially envelope the receiver. Desirably, the body members 80 are secured to each other and/or to the receiver 20 in some way, such as by fasteners (e.g., screws, ultrasonic welding, etc.) to prevent movement of the receiver with respect to the body members. After the handle subassembly is formed, the handle subassembly is overmolded to form a grip 84. For example, the handle subassembly can be overmolded with an elastomer material or another suitable material to provide a seamless outer grip 84.

It will be apparent that modifications and variations are possible without departing from the scope of the invention defined in the appended claims.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A knife comprising:

a handle having a handle body and a sleeve in the handle body, the handle body including opposite forward and rearward ends, the forward end of the handle body including a front opening, a first side opening, and a second side opening, the first and second side openings disposed on opposite sides of the handle body, each of the first and second side openings being contiguous with and extending rearward from the front opening; and a blade assembly including:

a blade;

a tang connected to the blade and extending rearward from the blade, the tang configured to be insertable into the front opening of the handle body and slidable into the sleeve of the handle for releasably mounting the blade assembly to the handle; and a blade assembly connection structure supported by the tang, the blade assembly connection structure sized and shaped to cover the front opening and the first and second side openings of the forward end of the handle body when the blade assembly is releasably mounted to the handle, the blade assembly connection structure including first and second arms, the first arm arranged to cover the first side opening of the forward end of the handle body when the blade assembly is releasably mounted to the handle, the second arm arranged to cover the second side opening of the forward end of the handle body when the blade assembly is releasably mounted to the handle, the tang having a rear end located rearward of the blade assembly connection structure;

wherein the handle and the blade assembly are configured to releasably lock together to maintain the tang in the sleeve for releasably mounting the blade assembly to the handle.

2. The knife of claim 1, wherein the blade assembly connection structure includes a collar arranged to cover the front opening of the forward end of the handle body when the blade assembly is releasably mounted to the handle.

3. The knife of claim 2, wherein the first and second arms each have opposite edges extending rearward from the collar, the opposite edges of the first arm being located along a first side of the tang and the opposite edges of the second arm being located along an opposite second side of the tang.

4. The knife of claim 1, wherein the first arm is spaced apart from a first side of the tang and the second arm is spaced apart from a second side of the tang, the handle configured to be present between the first arm and the first side of the tang and present between the second arm and the second side of the tang when the blade assembly is releasably mounted to the handle.

5. The knife of claim 4, wherein the sleeve of the handle includes a first side portion and a second side portion, the first side portion configured to be present between the first arm and the first side of the tang when the blade assembly is releasably mounted to the handle, and the second side portion configured to be present between the second arm and the second side of the tang when the blade assembly is releasably mounted to the handle.

6. The knife of claim 4, wherein the handle body includes a first channel and a second channel, and wherein the blade assembly connection structure of the blade assembly includes a first protrusion and a second protrusion, the first protrusion arranged to be received by the first channel of the handle body for releasably mounting the blade assembly to the handle, and the second protrusion arranged to be received by the second channel of the handle body for releasably mounting the blade assembly to the handle.

7. The knife of claim 6, wherein the first and second channels each have an open forward end.

8. The knife of claim 7, wherein the first channel includes opposite sides extending rearward behind the open forward end of the first channel, the first protrusion being configured to be received between the opposite sides of the first channel for releasably mounting the blade assembly to the handle, and wherein the second channel includes opposite sides extending rearward behind the open forward end of the second channel, the second protrusion being configured to be received between the opposite sides of the second channel for releasably mounting the blade assembly to the handle.

9. The knife of claim 8, wherein the first protrusion is inboard, toward the tang, of the first arm, and wherein the second protrusion in board, toward the tang, of the second arm.

10. The knife of claim 1, wherein the blade assembly connection structure of the blade assembly includes a first protrusion and a second protrusion, the first protrusion extending inboard with respect to the first arm toward the tang and being configured to mate with the handle for releasably mounting the blade assembly to the handle, the second protrusion extending inboard with respect to the second arm toward the tang and being configured to mate with the handle for releasably mounting the blade assembly to the handle.

11. The knife of claim 10, wherein the first arm is spaced apart from a first side of the tang and the second arm is spaced apart from a second side of the tang, the handle configured to be present between the first arm and the first side of the tang and present between the second arm and the second side of the tang when the blade assembly is releasably mounted to the handle.

12. The knife of claim 11, wherein the first arm is configured to form a taper fit with the first side opening and the second arm is configured to form a taper fit with the second side opening.

13. The knife of claim 1, wherein the first and second side openings each taper as the first and second side openings extend rearward, and wherein the first and second arms each taper as the first and second arms extend rearward to correspond to the taper of the first and second side openings.

14. The knife of claim 1, wherein the blade assembly connection structure comprises a first bracing portion and a second bracing portion, the first and second bracing portions sandwiching the tang between the first and second bracing portions.

15. The knife of claim 14, wherein the first bracing portion is between the tang and the first arm, and the second bracing portion is between the tang and the second arm.

16. The knife of claim 15, wherein the blade assembly connection structure includes a first gap between the first bracing portion and the first arm and a second gap between the second bracing portion and the second arm.

17. The knife of claim 1, wherein the sleeve has an elongate opening with an open front end configured to receive the tang for mounting the blade assembly to the handle, the open front end of the sleeve being located rearward of the front opening of the handle body.

18. The knife of claim 17, wherein the handle body comprises a first handle body member and a second handle body member, the first and second handle body members being connected together, the first and second handle body members sandwiching the sleeve between the first and second handle body members.

19. The knife of claim 18, wherein the handle body includes overmolding defining an outer exposed grip surface for assisting an operator in gripping the handle.

20. The knife of claim 1, wherein the handle or the blade assembly includes a catch configured to lockingly engage the other of the handle or the blade assembly to releasably lock the handle and the blade assembly together.

21. The knife of claim 20, further comprising a press surface configured to be manually pressed toward the tang to move the catch out of locking engagement with said other of the handle or the blade assembly.

22. The knife of claim 1, wherein the blade assembly connection structure is sized and shaped to close the front opening and the first and second side openings of the forward end of the handle body when the blade assembly is releasably mounted to the handle.

23. The knife of claim 1, wherein the blade assembly connection structure includes a catch arranged to be inserted into the front opening of the forward end of the handle body for releasably mounting the blade assembly to the handle, the catch being resiliently movable with respect to the tang to move into locking engagement with the handle to releasably lock the blade assembly to the handle.

24. The knife of claim 1, wherein the blade assembly connection structure is configured to form a taper fit with the handle body and a mating connection with the handle body different from the taper fit.

25. The knife of claim 1, wherein the blade assembly connection structure is configured to be exposed outside the handle from the front opening to the left and right side openings when the blade assembly is releasably mounted to the handle.

26. The knife of claim 1, wherein the handle body includes first and second exterior side surfaces extending between the forward and rearward ends of the handle body, the first and second side openings being located in the first and second exterior side surfaces.

27. The knife of claim 1, wherein the blade includes a front tip and a rear portion opposite the front tip, the rear portion being connected to the tang, the blade having a cutting edge and a second edge opposite the cutting edge, the blade having opposite first and second side faces, the blade lying in a blade plane that intersects the cutting edge and the second edge, the first and second side faces being positioned on respective opposite first and second sides of the blade plane, the first side face facing in a first lateral direction transversely with respect to the cutting edge, and the second side face facing in a second lateral direction transversely with respect to the cutting edge, the first arm and the first side opening being located to the first side of the blade plane when the blade assembly is releasably mounted to the handle, and the second arm and the second side opening being located to the second side of the blade plane when the blade assembly is releasably mounted to the handle.

28. The knife of claim 1, wherein the sleeve comprises a tubular member received in and supported by the handle body.

29. The knife of claim 1, wherein the blade assembly connection structure is configured to be exposed outside the handle from where the blade assembly connection structure covers the front opening to where the blade assembly connection structure covers the first side opening and from where the blade assembly connection structure covers the front opening to where the blade assembly connection structure covers the second side opening when the blade assembly is releasably mounted to the handle.

30. The knife of claim 1, wherein the blade assembly connection structure includes a first gap between the tang and the first arm and a second gap between the tang and the second arm.

* * * * *